United States Patent [19]

Shute

[11] Patent Number: 5,647,460

[45] Date of Patent: Jul. 15, 1997

[54] SPRING-TYPE RAILROAD BRAKE SHOE LOCKING KEY

[75] Inventor: Bruce W. Shute, West End, N.C.

[73] Assignee: Westinghouse Air Brake Company, Wilmerding, Pa.

[21] Appl. No.: 618,249

[22] Filed: Mar. 18, 1996

[51] Int. Cl.$^6$ ............................................. F16D 65/04
[52] U.S. Cl. ............................................. 188/243
[58] Field of Search ........................... 188/242–248, 188/265; 70/345; 403/294, 298

[56] References Cited

U.S. PATENT DOCUMENTS

| | | | |
|---|---|---|---|
| 854,475 | 10/1907 | Fairbanks | 188/243 |
| 2,031,127 | 2/1936 | Peycke | 188/243 |
| 2,094,273 | 9/1937 | Mack | 188/243 |
| 2,858,914 | 11/1958 | Arrasmith | 188/243 |
| 3,015,372 | 1/1962 | Landell et al. | 188/243 |
| 3,077,957 | 2/1963 | Arrasmith | 188/243 |
| 4,466,513 | 8/1984 | Dedek | 188/243 |
| 5,560,453 | 10/1996 | Conrad | 188/243 |

FOREIGN PATENT DOCUMENTS

| | | | |
|---|---|---|---|
| 2357048 | 5/1975 | Germany | 188/243 |
| 849310 | 9/1960 | United Kingdom | 188/243 |

*Primary Examiner*—Robert J. Oberleitner
*Assistant Examiner*—Chris Schwartz
*Attorney, Agent, or Firm*—Gary J. Falce

[57] ABSTRACT

A brake shoe locking key is provided with a retention tab that is saw-tooth shaped and extends across the entire width of the key shank. The retention tab is upraised from the shank more than the correspondingly-shaped serrations typically formed on the bottom of the key and is thus more effective in engaging the brake head as an initial detent to prevent the key from backing out of the keyhole in the brake head when a loose fitting key fails to retain its locking position. In addition, the retention tab is adapted to engage the keybridge at the orifice through which the key passes in order to provide a further detent to prevent a loose key from backing completely out of its locking connection between the brake head and brake shoe, in the event the first detent fails to engage.

7 Claims, 5 Drawing Sheets

SPRING-TYPE RAILROAD BRAKE SHOE LOCKING KEY

BACKGROUND OF THE INVENTION

The present invention relates to brake shoe assemblies for railroad cars and particularly to spring-type brake shoe locking keys that are adapted to removably affix a brake shoe to its brake head.

In FIG. 1, there is shown a brake shoe assembly including a spring-type brake shoe locking key 110 adopted by the Association of American Railroads (A.A.R.) as an alternate standard for the standard tapered-type key. Studies have shown the tapered key to be subject to accelerated wear, which results in loss of its ability to firmly affix the brake shoe to its backing plate. As is well-known, any looseness at the brake shoe/brake head interface results in undesirable brake head wear due to vibrations typically encountered in railroad service. The alternate standard brake shoe key 110 shown in FIG. 1 is made of spring steel and firmly holds the brake shoe 136 to the brake head 138 under tension of the spring load created in the locking key as a result of the key being flexed when driven into its locking position. This spring tension of the locking key takes up play between the brake head and shoe, to prevent the brake shoe backing plate 137 from impacting the brake head in the face of such vibration as would otherwise cause impact forces to rapidly wear the brake head.

A disadvantage of this spring-type key 110 is the difficulty encountered in attempting to remove the key when the key has been driven fully into its locking position beyond the initial locking position shown in FIG. 1. In this initial locking position, an offset notch 122 intermediate the key head 114 and the end 128 of the key engages the end of the brake head carrier lug 146. The latching force of this engagement under spring tension combined with the force of friction between the key and brake head is intended to prevent the key from being dislodged in service. A pry bar is typically employed by railroad personnel to force the key out of its locking position by wedging the pry bar between the head of the key and the brake head. In the fully driven locking position of the brake shoe key, however, the key head abuts the brake head, making it difficult to wedge a pry bar therebetween. For this reason, railroad personnel have been prone to drive the brake shoe key short of its locking position, in order to facilitate subsequent removal of the key.

While the foregoing practice assures that the head of the key is spaced sufficiently from the brake head to accommodate the insertion of a pry bar therebetween, failure to drive the key at least into its initial locking position shown in FIG. 1 results in the brake shoe being affixed to the brake head with less than sufficient flexure force to prevent vibration from causing impact wear of the brake head.

This brake head wear at the interface with the brake shoe backing plate tends to further reduce the spring tension of the locking key such that continued vibration and consequent wear become progressively worse. Under such conditions, the locking key loosens to such extent that the key is prone to be dislodged in service.

For this reason, the bottom end 128 of this spring-type locking key is formed with a series of serrations. As shown in FIG. 1, these serrations are intended to engage the lower end of the brake head to prevent a loose key and/or a key driven short of its initial locking position from becoming unintentionally dislodged from its connection between the brake shoe and brake head during service, particularly in the absence of any latching force between the offset notch 122 and the brake head carrier lug 146.

It has been found in actual practice, however, that these serrations do not always perform as intended for various reasons, such as tolerance variations that arise from the many different combinations of brake head and brake shoe designs employed.

Loss of a loose brake shoe key can occur in normal service due to the key being jarred free of its connection between the brake shoe and backing plate by vibration when the serrations formed on the end of the key fail to engage the bottom of the brake head. This problem is even more acute in rotary dump service where special cars carrying coal, for example, are turned upside-down to empty the coal. In this case, gravity encourages a loose key to become dislodged from its engagement between the brake shoe and brake head. In either case, a lost key permits the brake shoe to fall off of its brake head so that in addition to a lost brake shoe, brake force normally provided by the brake shoe is not realized. In addition, the shoeless brake head can contact the wheel during a brake application and become damaged.

In rotary dump service, this problem of lost brake shoe keys is further exacerbated by reason of the fact that a dislodged key typically falls into the coal deposit. This creates a considerable expense for power plant operators in providing metal detectors to locate lost keys in the coal deposit and for the removal of these keys, especially where these lost keys represent potential damage to expensive equipment, such as pulverizing machinery etc.

SUMMARY OF THE INVENTION

It is therefore the object of the present invention to prevent a spring-type brake shoe locking key from being unintentionally dislodged from an assembled position connecting a brake shoe to its brake head when wear therebetween renders key flexure reduced to such extent as to appreciably loosen the key.

It is an extension of the foregoing to modify the present standard spring-type locking key in a manner to achieve the stated objective without incurring any substantial increase in cost and without adversely affecting the ability of the key to lock the brake shoe in tight relationship with its backing plate absent any wear therebetween.

In accomplishing these objectives, a standard, spring-type locking key for connecting a railroad brake shoe to a brake head is modified to provide a latching detent in the form of a saw-tooth shaped retention tab that is upraised from the surface of the key shank sufficiently to engage first, the bottom of the brake head and eventually the key bridge orifice in the event the key becomes loose and backs out of its locking position. In its engagement with the brake head at the keyway therein, the retention tab achieves a more effective detent therewith than obtained with the similarly shaped serrations on a standard key; and in its engagement with the keybridge orifice, the retention tab achieves an additional detent therewith in the event the first mentioned detent is ineffective.

BRIEF DESCRIPTION OF THE DRAWINGS

These and other objects and advantages of the invention will become apparent from the following more detailed explanation when taken in conjunction with the drawings in which.

DESCRIPTION AND OPERATION

Figure 2:
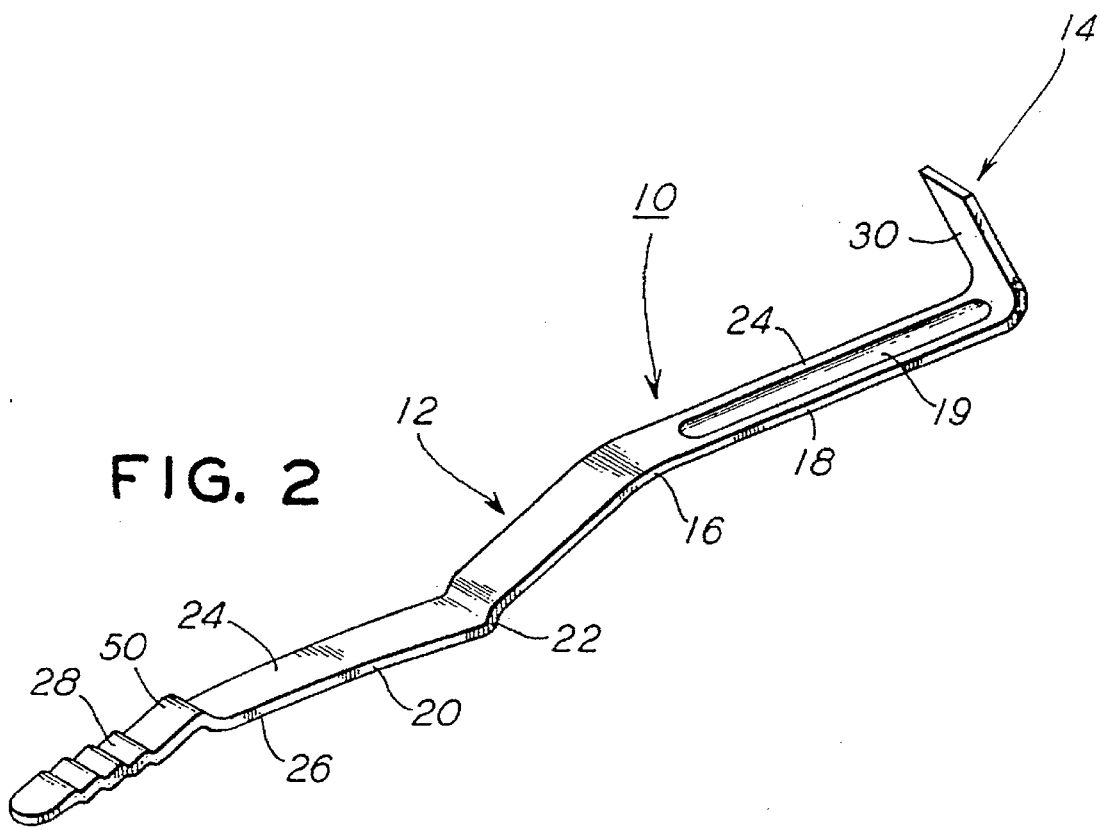
FIG. 2 is an axonometric view showing a spring-type brake shoe key similar to the key of FIG. 1, but modified to provide a retention tab in accordance with the present invention.

Referring now to FIG. 2, there is shown a brake shoe key 10 in accordance with the present invention. This brake shoe key 10 consists of a shank 12 and a head 14 that are formed from a flat strip of spring metal having a generally curvilinear profile. Shank 12 includes an arcuate section 16 and a generally straight section 18 that is integral with head 14 at one end and with arcuate section 16 at its other end. This section 18 may be formed with a strengthening groove 19. The end of key 10 having head 14 is typically referred to as the top of the key. Another arcuate section 20 of shank 12 is joined to arcuate section 16 by an offset notch 22. The opposing faces 24 and 26 of shank 12 are formed with a serrated end portion 28 at the bottom of key 10.

Head 14 of brake shoe key 10 is formed by a stop leg 30 that is outturned from face 24 of shank 12 at an angle generally less than 90°.

Figure 1:
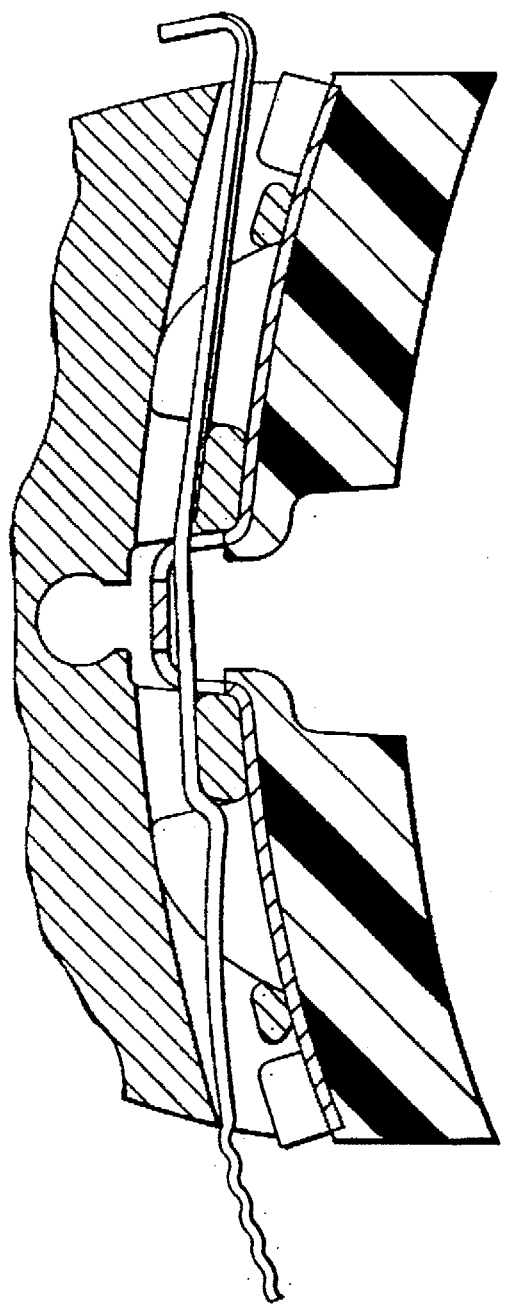
FIG. 1 is a sectional assembly view of a brake shoe affixed to a brake head by a spring-type brake shoe key known in the art, the brake shoe key being shown in an initial locking position.

When affixing a brake shoe 36 to a brake head 38, brake shoe key 10 is manually positioned in a keyway 40 of brake head 38 and an aperture 42 of brake shoe key bridge 44 a distance sufficient to initially hold the brake shoe backing plate 37 in place against brake head 38. Hammer blows are then applied to stop leg 30 to forcibly drive key 10 to at least an initial locking position in which offset notch 22 rides over and engages the bottom side of a carrier lug 46 of brake head 38. This position of key 10 corresponds to the position of the prior art key shown in FIG. 1. Notch 22 and carrier lug 46 provide a latching detent to prevent undesired displacement of key 10 from its locking position. It will also be appreciated that in driving key 10 into this locking position, key 10 is forced to deform under compression from its normal configuration shown in FIG. 2 in accordance with the space provided between key bridge 44 and brake head 38. In this manner, spring tension is developed to maintain brake shoe 36 in tight engagement with brake head 38.

Figure 3:
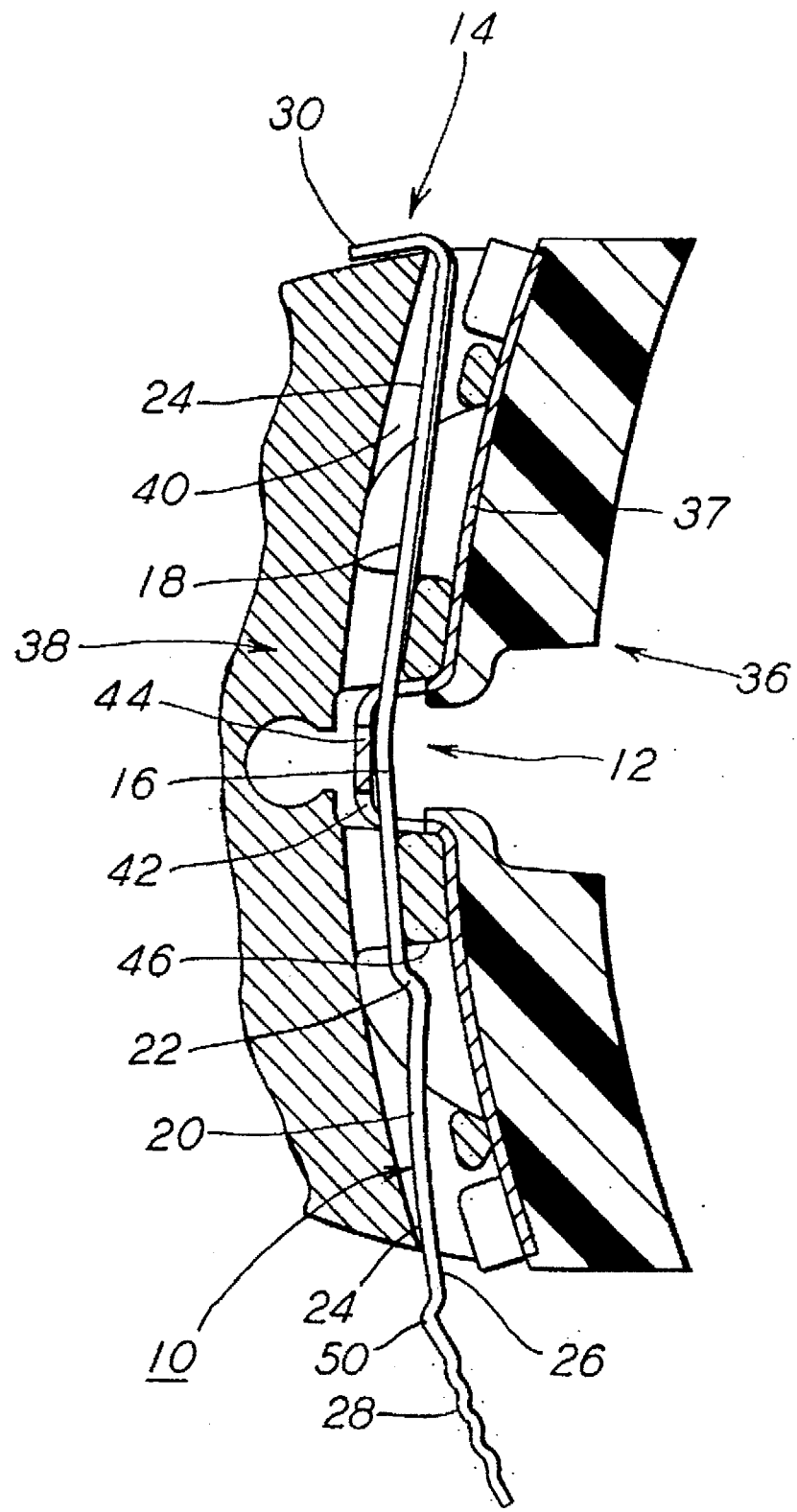
FIG. 3 is a sectional assembly view of a brake shoe affixed to a brake head by the brake shoe key of FIG. 2, which is shown in a full locking position.

It will be understood that key 10 may be driven beyond this initial locking position to a full locking position, until stop leg 30 abuts the upper end of brake head 38, as shown in FIG. 3, without loss of any appreciable spring tension. As previously discussed, however, this makes insertion of a pry bar between stop leg 30 and brake head 38 difficult, resulting in the inappropriate practice of driving brake shoe keys short to assure sufficient space between stop leg 30 and brake head 38 to insesrt a pry bar and thereby facilitate key removal.

This inappropriate practice of driving a brake shoe key short of its initial locking position means that the, offset notch 22 may not ride over carrier lug 46 enough to engage its bottom side in order to-latch the key in its locking position. In view of this possibility, serrated upper surface 28 of shank 12 is intended to engage the bottom of brake head 38 to prevent the key from becoming completely dislodged from its connection between brake head 38 and brake shoe backing plate-37 absent a latching detent between notch 22 and carrier lug 46. It will be appreciated, however, that in the event the key becomes loose in its connection between brake head 38 and backing plate 37, for any reason, such as brake head wear for example, flexure of the key may be reduced enough that the serrated end portion 28 of the key does not engage brake head 38, as intended. Accordingly, the key becomes free to pass through keyway 40 and the aperatures 42 in key bridge 44 of backing plate 37. Frictional engagement of a loose key being reduced, as well, the key is relatively unrestrained from being jarred free of its engagement between the brake head and brake shoe in normal service and from falling out of such engagement during rotary dump service, as previously discussed.

Figure 5:
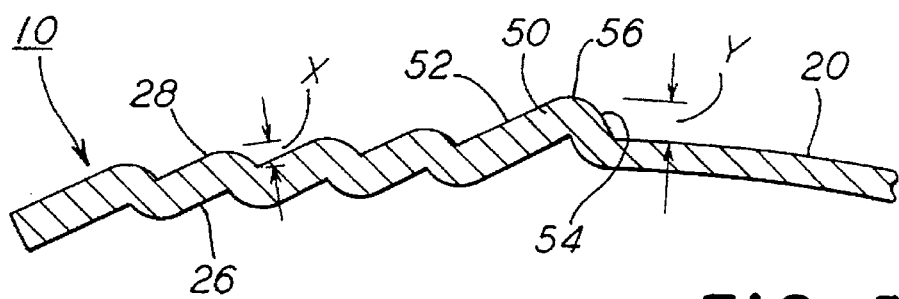
FIG. 5 is an enlarged fragmentary view of the brake shoe key of the present inventions.
Figure 6:
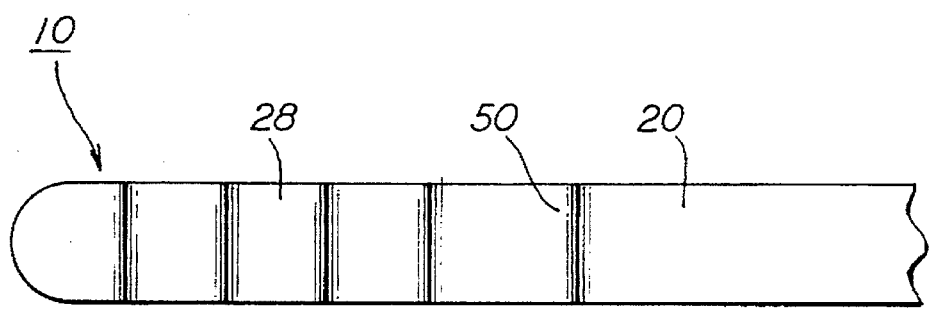
FIG. 6 is a partial plan view of the brake key of the present invention.
Figure 4:
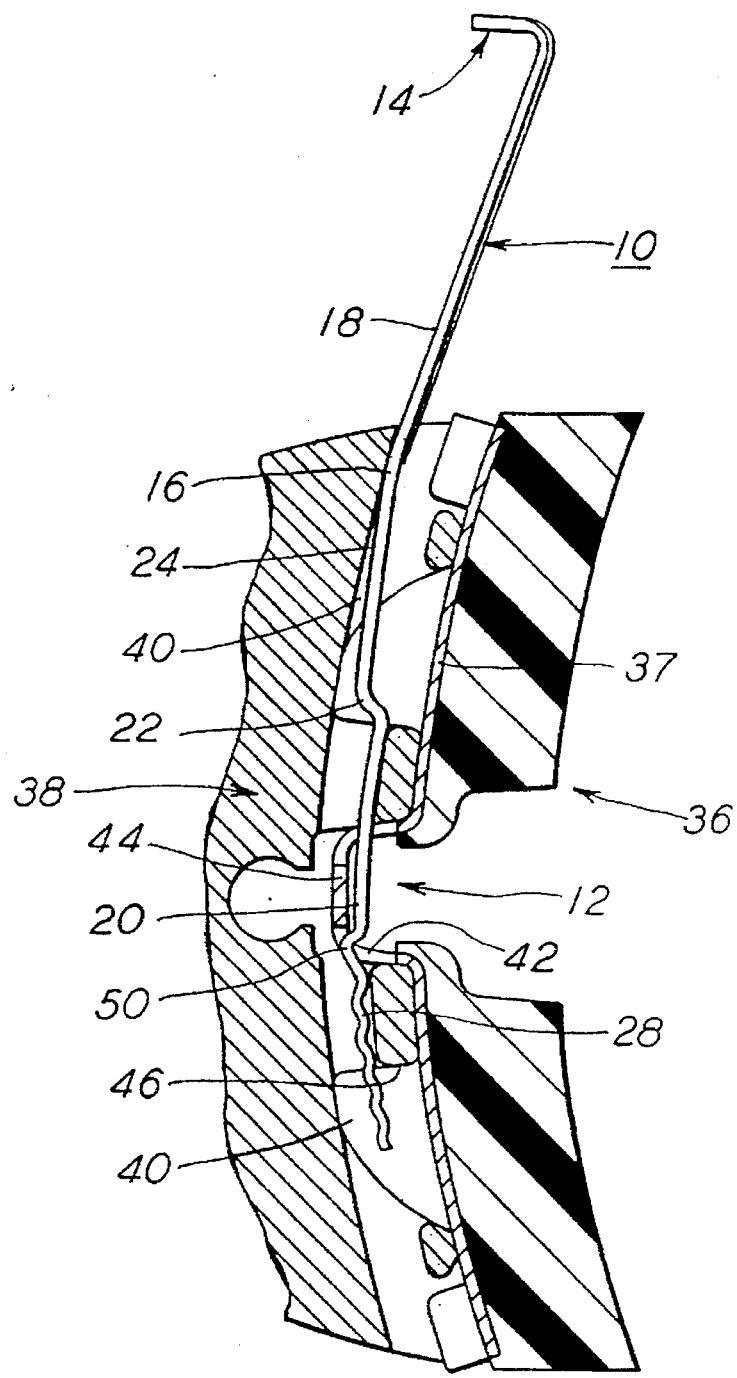
FIG. 4 is a sectional assembly view of a brake shoe affixed to a brake head by the brake shoe key of FIG. 2, illustrating how the locking key according to the present invention cooperates with the brake shoe key bridge to prevent the key from becoming unintentionally dislodged.
Figure 7:
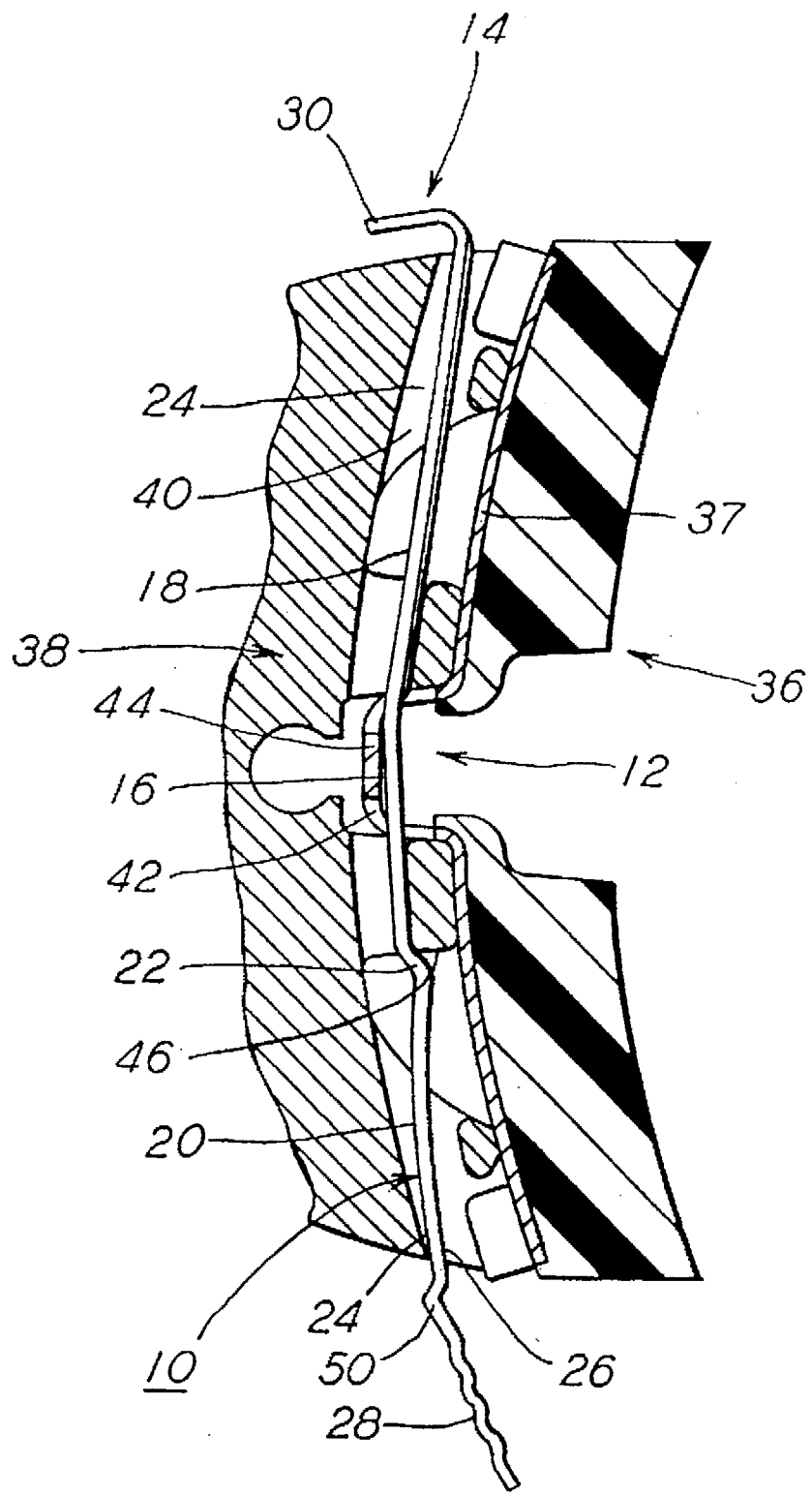
FIG. 7 is a sectional assembly view of a brake shoe affixed to a brake head by the brake shoe key of FIG. 2, which is shown in an initial locking position.

In accordance with the present invention, and referring to FIGS. 2–4, brake shoe key 10 is modified to include a retention tab 50 adjacent serrated end portion 28. As shown in FIGS. 2 and 5, this retention tab has a saw-tooth shape corresponding to serrations 28, but is upraised from upper surface 24 a distance Y that is greater than the distance X that serrations 28 are upraised from surface 24.

Being shaped similar to Serrations 28, retention tab 50 extends across the entire width of shank 12 and is formed with a first lateral side 52 having a relatively shallow angle of inclination and a second lateral side 54 having a relatively steep angle of inclination. Sides 52 and 54 terminate in an arcuate crest 56. Tab 50 is located longitudinally along shank 12 so as to be disposed beyond the end of keyway 40 in both the initial and full locking position of key 10. In the event key 10 becomes sufficiently loose that notch 22 is able to freely pass over its stop provided by the bottom of carrier lug 46 and thereby permit key 10 to back out of its locking position, side 54 of tab 50 will engage the bottom of brake head 38 at keyway 40 to retain the key in its connection between the brake head 38 and brake shoe 36 to prevent the key from being dislodged.

In the event key 10 is so loose, however, that tab 50 fails to engage the bottom of brake head 38, and continues to back out of key 40, side 54 of tab 50 will eventually abut key bridge 44 at orifice 42, as shown in FIG. 4. In this manner, tab 50 is effective to prevent key 10 from backing completely out of keyway 40. Moreover, the longitudinal location of tab 50 is selected so that in addition to being disposed beyond keyway 40 in the locking position of key 10, arcuate section 16 remains within keyway 40 when tab 50 is engaged with keybridge 44. In this regard, key 10 is not only positively retained in its locking connection between brake head 38 and brake shoe 36, but is retained under at least a minimum of spring tension. It will be appreciated, therefore, that key 10 is not only prevented from inadvertent loss, but its retention assures that the brake shoe 36 will not fall off of its brake head 38.

When it is desired to remove the key 10, in order to change brake shoes for example, a sharp blow on head 14 in the direction of key removal will sufficiently deform the key at tab 50 and/or keybridge 44 to allow the rounded crest 56 to smoothly ride over the edge of the orifice 42 with which side 54 is engaged to release the detent therebetween.

When key 10 is inserted during replacement of a brake shoe for example, side 52 of tab 50 engages the key bridge at orifices 42, but having a relatively shallow angle of inclination, offers only minimal resistance to insertion of the key. It should be understood that since key 10 is not yet fully deflected under tension during such time as when tab 50 is forced through orifices 42, this minimal resistance necessary to pass tab 50 is not expected to require any greater effort than is presently required to insert a standard, spring-type brake shoe key such as the prior art key of FIG. 1.

I claim:

1. For connecting a railroad brake shoe to a brake head having a keyway with a recess in which an upraised keybridge of said brake shoe having at least one orifice is received, there is provided a locking key adapted for insertion through said keyway via said at least one orifice to a locking range of positions, said key comprising:

(a) an elongated shank formed from a unitary strip of spring metal having serrated portion at a bottom end of said key including a plurality of correspondingly sized individual serrations extending laterally the entire width of said shank;

(b) a retention tab upraised from at least one surface of said shank and extending laterally the entire width thereof, said retention tab further comprising:

(i) a first lateral surface having a predetermined angle of inclination with said at least one surface of said shank;

(ii) a second lateral surface having an angle of inclination with said at least one surface of said shank greater than said predetermined angle of inclination; and (iii) a crest between said first and second lateral surfaces upraised from said one surface of said shank a greater distance than a distance any one of said plurality of serrations is upraised therefrom, said second lateral surface being engageable with said keybridge at said at least one orifice to provide a first detent therewith whereby said key is prevented from becoming unintentionally dislodged from said keyway and said keybridge when said key is displaced from said locking range of positions.

2. A brake shoe key as recited in claim 1, wherein said crest is arcuate shaped.

3. A brake shoe key as recited in claim 1, wherein said key further comprises an arcuate section engageable with said keybridge in said locking range of positions, said retention tab being located longitudinally along said key such as to be engageable with said keybridge when said key is displaced longitudinally from said locking range of positions without said arcuate section being displaced from said keyway.

4. A brake shoe key as recited in claim 3, wherein said key further comprises an offset notch intermediate said arcuate section and said retention tab, said offset notch being engageable with said brake head within said keyway to provide a second detent in accordance with an initial locking position of said key in said locking range.

5. A brake shoe key as recited in claim 4, wherein said retention tab in said initial locking position is located adjacent a first side of said brake head beyond said keyway, said tab being engageable with said first side of said brake head to provide a third detent therewith in the absence of said second detent maintaining said key in at least said initial locking position of said locking range.

6. A brake shoe key as recited in claim 5, wherein said retention tab is engageable with said first side of said brake head to provide said third detent prior to said retention tab engaging said keybridge to provide said first detent.

7. A brake shoe key as recited in claims 6, wherein said key further comprises an outturned stop leg at a top end of said shank formed integral therewith, said top leg being engageable with a second side of said brake head opposite said first side said initial locking position and engageable with said second to limit said insertion of said key into said keyway a distance corresponding to a full locking position of said locking range of positions beyond said initial locking position.

* * * * *